United States Patent [19]
Minomiya et al.

[11] Patent Number: 5,880,182
[45] Date of Patent: Mar. 9, 1999

[54] WATER-REDUCING ADMIXTURES FOR CEMENTITIOUS COMPOSITIONS

[75] Inventors: Yoshikazu Minomiya, Odawara; Akira Ohta, Chigasaki; Minoru Yaguchi, Fujisawa, all of Japan

[73] Assignee: MBT Holding AG, Zurich, Switzerland

[21] Appl. No.: 801,309

[22] Filed: Feb. 18, 1997

Related U.S. Application Data

[63] Continuation of Ser. No. 536,288, Oct. 2, 1995, abandoned, which is a continuation of Ser. No. 330,643, Oct. 28, 1994, abandoned.

[30] Foreign Application Priority Data

Oct. 29, 1993 [JP] Japan ..................................... 5-304519

[51] Int. Cl.$^6$ ................................ C08K 3/00; C08L 1/02; C08L 3/02; C08L 5/04
[52] U.S. Cl. .................................. 524/5; 524/27; 524/35; 524/47; 524/48; 524/54; 524/55; 524/56; 524/58; 106/729; 106/730; 106/804
[58] Field of Search .................................. 524/5, 27, 35, 524/47, 48, 54, 55, 56, 58, 77; 106/729, 730, 804

[56] References Cited

U.S. PATENT DOCUMENTS 3,368,987  2/1968  Pollart et al. .............................. 524/47

FOREIGN PATENT DOCUMENTS 57-0088046  6/1982  Japan ..................................... 524/278
0000291  1/1986  WIPO ..................................... 106/730

*Primary Examiner*—Peter A. Szekely
*Attorney, Agent, or Firm*—Fish & Richardson P.C.

[57] ABSTRACT

An admixture for decreasing the water demand of cementitious compositions such as concrete consists of (a) from 75–25% by weight of a water-reducing agent whose major component is a polycarboxylate; and (b) from 25–75% by weight of at least one saccharide component selected from hydrogenated saccharides and polyhydric alcohol adducts of saccharides.

The saccharide component is preferably a hydrogenated polysaccharide with a molecular weight distribution as follows:

(i) 70–30% by weight (on total weight of hydrogenated saccharides) have molecular weights in the range 180–300;

(ii) 30-70% by weight have molecular weights of from 300 up to 4,000; and (iii) 30% by weight maximum have molecular weights of 4,000 and over.

18 Claims, No Drawings

WATER-REDUCING ADMIXTURES FOR CEMENTITIOUS COMPOSITIONS

This application is a continuation application of U.S. Ser. No. 08/536,288, which is in turn a continuation of U.S. Ser. No. 08/330,643 both of which are now abandoned.

This invention relates to an admixture for cementitious compositions such as grouts, mortars and concretes.

Increasing difficulty in and expense of obtaining high quality aggregate for use in cementitious compositions such as concrete has forced manufacturers to resort to lower grade materials such as crushed stone, marine sand and even crushed concrete obtained from the demolition of old structures. This leads to problems with the concrete such as higher water demand, bleeding and lower workability and pumpability. It has been attempted to overcome these problems by means of admixtures. Typical of such admixtures are those already well known in the art, such as lignosulphonates, naphthalene sulphonate-formaldehyde condensates and various saccharides. Such materials reduce water requirement but also delay setting of the concrete, something which is not always desirable.

It has now been found that a blend of particular materials can greatly decrease the quantity of water required for a given cementitious mix while not significantly increasing set time. In addition, the blend does not cause excessive aeration (a major problem with some known admixtures) and it inhibits bleeding and improves workability. The invention therefore provides an admixture for use in a cementitious composition, which admixture consists of (a) from 75–25% by weight of a water-reducing agent whose major component is a polycarboxylate; and (b) from 25–75% by weight of at least one saccharide component selected from hydrogenated saccharides and polyhydric alcohol adducts of saccharides.

The water-reducing agent has as a major component a polycarboxylate which is known to be a water-reducing agent in its own right. By "major component" is meant that the polycarboxylate or polycarboxylates (it is permissible to use more than one such material) is present in higher weight proportion than any other individual component in the water-reducing agent. It is therefore possible for the polycarboxylate to comprise less than 50% of the weight of the water-reducing agent, although it is preferable that it comprises at least 50%. More preferably, the water reducing agent comprises at least 60% by weight of polycarboxylate and most preferably it is 100% polycarboxylate. Typical examples include poly(acrylate salt-acrylate ester) copolymers, poly(methacrylic acid-methacrylate) copolymers, poly(styrene-maleate salt) copolymers, and poly(styrene-maleate ester) copolymers. Such materials are readily available commercially, for example, the SP-8 series of materials from Nisso Master Builders (NMB) Ltd, Japan.

The water-reducing agent may additionally contain at least one other non-carboxylate water-reducing agent. Any known water-reducing agent is satisfactory and typical examples include lignosulphonates and naphthalene sulphonate-formaldehyde condensates.

The hydrogenated saccharides which are one possibility for use in this invention as a saccharide component as hereinabove mentioned may be derived from mono- or disaccharides, but are preferably derived from polysaccharides, more preferably starches. Examples of suitable saccharides which may be hydrogenated include starch hydrolysates, glucose fermentation products, celluloses, cellulose hydrolysates, hernicelluloses and hemicellulose hydrolysates, starch hydrolysates being especially desirable. Commercial examples of suitable materials include D-Sorbit and PO-20 of Towa Kasei and SE-100 of Nikken Kagaku. Other materials include hydrogenated oligosaccharides, for example, of the type described in U.S. Pat. No. 4,073,658.

The polyhydric alcohol adducts of saccharides which are the other possibility for use as a saccharide component are materials wherein the saccharide has a calculated or a weight average molecular weight of from 2,000–10,000, and they additionally comprise polyhydric alcohol residues added at the end of the saccharide chains. The preferred polyhydric alcohols are alkylene and polyalkylene glycols, glycerol, xylitol, erythritol and sorbitol, most preferred being polyethylene glycol or polypropylene glycol present such that the number of mols of ethylene oxide or propylene oxide present per mol of saccharide is from 1–100—larger polyethylene and polypropylene glycols (especially the former) give rise to higher air-entraining properties, which is usually not desirable. For saccharides having a relatively small molecular weight, the molecular weight is generally a calculated molecular weigth whereas those having a larger molecular weight, the molecular weight is a weight average molecular weight.

When hydrogenated saccharides are used as the saccharide component, they are preferably present as a mixture of which (i) 70–30% by weight (on total weight of hydrogenated saccharides) have calculated molecular weights in the range 180–300;

(ii) 30–70% by weight have calculated or weight average molecular weights of from 300 up to 4,000; and (iii) 30% by weight maximum have weight average molecular weights of 4,000 and over.

These proportions may have a considerable effect on the invention. For example, a proportion of greater than 30% of material of molecular weight 4,000 and above results in a lowered workability and greater water demand. This also occurs when the proportion of the other molecular weight materials falls outside the stated proportions. The excellent properties of the invention are not fully realized in this case when only one or the other of the two hydrogenated saccharides (i) and (ii) is used—the presence of both gives best results.

The dosage of the admixture of this invention is dependent on the cement composition used, but basically it will suffice for it to be in sufficient quantity to impart the desired water reduction and adequate workability to the composition. A typical quantity is 0.05 to 3.00 percent of the admixture by weight of cement.

It is possible and permissible to use other admixtures in conjunction with the admixture of this invention to achieve particular results. Typical examples of suitable admixtures include air-entraining agents, shrinkage reducing agents, accelerating agents, retarding agents, foaming agents, defoaming agents, rust-inhibiting agents, quick-setting agents and water-soluble polymer substances.

The admixture of this invention may be used in generally-used cement compositions such as cement, paste, mortar, grout, and concrete as a matter of course, but it is especially useful in the manufacture of cementitious compositions of comparatively high unit water contents due to the influence of the aggregate used, cementitious compositions for which good workability cannot be obtained by other means, lean-mix concrete of low unit cement content with which good workability is difficult to obtain, pumped concrete, high-strength concrete, cement products, masonry mortar and injection grout.

The invention therefore also provides a method of reducing the water demand of a cementitious composition by the addition thereto of an admixture as hereinabove defined. The components may be added individually to the composition, but it is preferred to add them simultaneously, and more preferably as a blend.

The invention additionally provides a cementitious composition which comprises an admixture as hereinabove defined.

This application is a continuation-in-part of U.S. Ser. No. 08/330,643, now abandoned, the contents of which are hereby incorporated by reference.

The invention is further described with references to the following non-limiting examples in which all parts are expressed by weight.

MANUFACTURING EXAMPLE 1

Four hundred parts of starch hydrolysate and 20 parts of xylitol are added to 100 parts of anhydrous toluene and the mixture heated to 80° C., at which point 10 parts of tungstophosphoric acid is added and stirring is carried out for 30 minutes. Reaction is then stopped by adding distilled water. The mixture is neutralized and the solvent is removed. The mixture is purified, and all matter of molecular weight exceeding 10,000 is removed by ultrafiltration. The resulting product is designated Sample A.

MANUFACTURING EXAMPLE 2

Four hundred parts of starch hydrolysate and 20 parts of erythritol are added to 100 parts of anhydrous toluene, and the procedures of Manufacturing Example 1 are carried out. Sample B is obtained.

MANUFACTURING EXAMPLE 3

Four hundred parts of starch hydrolysates and 20 parts of sorbitol are added to 100 parts of anhydrous toluene, and the procedures of Manufacturing Example 1 are carried out. Sample C is obtained.

MANUFACTURING EXAMPLE 4

Four hundred parts of starch hydrolysates and 20 parts of glycerol are added to 100 parts of anhydrous toluene, and the procedures of Manufacturing Example 1 are carried out. Sample D is obtained.

MANUFACTURING EXAMPLE 5

Four hundred parts of starch hydrolysate and 5 parts of ethylene glycol (1 mol) are added to 100 parts of anhydrous toluene, and the procedures of Manufacturing Example 1 are carried out. Sample E is obtained.

MANUFACTURING EXAMPLE 6

One hundred parts of starch hydrolysate and 20 parts of ethylene glycol (4 mols) are added to 100 parts of anhydrous toluene, and the procedures of Manufacturing Example 1 are carried out. Sample F is obtained.

MANUFACTURING EXAMPLE 7

One hundred parts of starch hydrolysate and 60 parts of ethylene glycol (12 mols) are added to 100 parts of anhydrous toluene, and the procedures of Manufacturing Example 1 are carried out. Sample G is obtained.

MANUFACTURING EXAMPLE 8

One hundred parts of starch hydrolysate and 120 parts of ethylene glycol (24 mols) are added to 100 parts of anhydrous toluene, and the procedures of Manufacturing Example 1 are carried out. Sample H is obtained.

MANUFACTURING EXAMPLE 9

One hundred parts of starch hydrolysate and 250 parts of ethylene glycol (50 mols) are added to 100 parts of anhydrous toluene, and the procedures of Manufacturing Example 1 are carried out. Sample I is obtained.

MANUFACTURING EXAMPLE 10

One hundred parts of starch hydrolysate and 500 parts of ethylene glycol (100 mols) are added to 100 parts of anhydrous toluene, and the procedures of Manufacturing Example 1 are carried out. Sample J is obtained.

MANUFACTURING EXAMPLE 11

One hundred parts of starch hydrolysate and 10 parts of propylene glycol (1 mol) are added to 100 parts of anhydrous toluene, and the procedures of Manufacturing Example 1 are carried out. Sample K is obtained.

MANUFACTURING EXAMPLE 12

One hundred parts of starch hydrolysate and 40 parts of propylene glycol (4 mols) are added to 100 parts of anhydrous toluene, and the procedures of Manufacturing Example 1 are carried out. Sample L is obtained.

MORTAR AND CONCRETE EXAMPLES

1) Mix Proportions, Preparation and Materials of Mortar and Concrete 1-1) Mortar Mortar is designed for flow of 200 to 210 mm and target air content of 8.0 volume percent in accordance with the mix proportions of Table 1, and prepared with the respective materials measured for a yield as mixed of 5 litres, with mixing done for 120 seconds after introduction of all materials into an ASTM mortar mixer.

1-2) Concrete

Concrete is designed for target slump of 18.0±0.5 cm and target air content of 4.5±0.5 volume percent in accordance with the mix proportions of Table 2, and prepared with the respective materials measured out for a yield as mixed of 80 liters, with mixing done for 90 seconds after introduction of all materials into a 100-liter pan-type power-driven blade mixer.

1-3) Materials a) Fine aggregate:
   Oi River system pit sand (specific gravity=2.58, fineness modulus=2.76);

b) Coarse aggregate:
   Ohme graywacke crushed stone (specific gravity=2.65, maximum size=20 mm);

c) Cement:
   Ordinary portland cement (specific gravity=3.16, mixture in equal parts of cement manufactured by Onoda, Sumitomo, and Mitsubishi firms);

d) Water-reducing agent:
   A polycarboxylate which is a copolymer of methacrylate salt and methacrylate ester (abbreviated as PCA in Tables 3, 4 and 5) Lignosulphonate (abbreviated as Lig in Tables 3, 4 and 5) Melamine sulphonate-formalin condensate (abbreviated as MS in Tables 3:, 4 and 5) Naphthalene sulphonate-formalin condensate (abbreviated as BNS in Tables 3, 4 and 5); A carboxylate which is a copolymer of styrene and maleate (abbreviated as SMA in Tables 3, 4 and 5)

e) Hydrogenated saccharide:

Hydrogenated starch hydrolysates, such as D-Sorbit and PO-20 manufactured by Towa Kasei Kogyo, and Sorbit C, SE-100 manufactured by Nikken Kagaku, designated b1, b2, and b3, obtained by fractioning to the molecular weights of 180–<300, >300 and >4,000 respectively by an ultrafiltration apparatus (a Lab Module Type 20 ex DDS Corp. Denmark).

Polyhydric alcohol adduct of saccharides
(molecular weights are weight average molecular weights)

Sample A: (Average molecular weight=3,000)
Sample B: (Average molecular weight=3,100)
Sample C: (Average molecular weight=3,100)
Sample D: (Average molecular weight=3,000)
Sample E: (Average molecular weight=2,900)
Sample F: (Average molecular weight=3,100)
Sample G: (Average molecular weight=3,300)
Sample H: (Average molecular weight=3,800)
Sample I: (Average molecular weight=3,400)
Sample J: (Average molecular weight=9,800)
Sample K: (Average molecular weight=2,900)
Sample L: (Average molecular weight=3,100)
Sample M: (Polyethylene glycol adduct of 30–80, mfd, by Towa Kasei, average molecular weight=3,200)
Sample N: (Glycerol adduct of starch hydrolysate, mfd. by Towa Kasei, average molecular weight=350)
Sample O: (Propylene glycol adduct of starch hydrolysate, mfd. by Towa Kasei, average molecular weight=250)
Sample P: Polyethylene glycol adduct of starch hydrolysate, average molecular weight=13,000, ethylene glycol 24-mol adduct)
Sample Q: (Polyethylene glycol adduct of starch hydrolysate, average molecular weight=5,100, ethylene glycol 120-mol adduct)

2) Methods of testing Mortar and Concrete 2-1) Mortar

Water-reducing properties and air-entraining properties of mortar are evaluated measuring flow and air content.

a) Flow:
   In accordance with JIS A 5201;
b) Air content:
   In accordance with JIS A 1116;
c) Water-reducing property evaluation:
   Water-reducing property is evaluated by the difference between flow when using the additive and flow of plain mortar;
d) Existence of synergistic improvement in water-reducing property:
   It is indicated whether the increase in water-reducing property of the water-reducing agent is synergistically improved or is an aggregate sum.

The test results are given in Tables 3 and 4.

2-2) Concrete

Concrete is evaluated by time of setting, bleeding, and visual observation of workability in accordance with the following criteria. Compressive strength at 28-day stage is also measured (see Table 5).

a) Slump:
   In accordance with JIS A 1101;
b) Air content:
   In accordance with JIS A 1128.
c) Compressive strength:
   In accordance with JIS A 1118 and JIS A 1132.
d) Time of setting:
   In accordance with Appendix 2, JIS A 6204.
e) Bleeding:
   In accordance with JIS A 1123.
f) Visual observation:
   Workability was evaluated by visual observation as described below.
   A (good): The concrete flows smoothly, without any segregation of the aggregate being seen.
   B (ordinary): Smooth flow, but with a degree of "crumbling" (evident presence of coarse aggregate).
   C (poor): Much coarse aggregate clearly visible—poor flow or no flow at all.

3) Test Results 3-1) Mortar

The results of tests with mortar are given in Tables 3 (hydrogenated saccharide) and 4 (polyhydric alcohol adduct of saccharide). In Table 3, the test results of Examples 1 to 13, and the results of plain mortar completely free of water-reducing agents or other cement additives (Comparison Example 1), and mortars with addition of only water-reducing agent (Comparison Example 2), only hydrogenated saccharides (Comparison Examples 3 to 6), and hydrogenated saccharides mixed with water-reducing agent (Comparison Examples 7 to 13) are given.

As can be seen in the results given in Table 3, when the cement additive of this invention is used in mortar (Examples 1 to 12), the following observations may be made:

a) Water-reducing Properties

Comparison Example 1 is a case of plain mortar in which there is completely no addition of admixture and the increase in water-reducing properties is evaluated with the flow value of this mortar as the basis.

Examples 1 to 5 are cases of the proportions of b1 and b2 being varied. It can be seen that, when b1 is in the range of 70 to 30 weight percent and b2 30 to 70 weight percent, the water-reducing properties of the admixture exceeds the aggregated individual water-reducing properties of the water-reducing agent, indicating a synergistic effect and a considerable and unexpected increase in water-reducing properties. In contrast, Comparison Examples 10 and 11 are cases where the mixture ratios of b1 and b2 lie outside the above mentioned ranges of b1 and b2. In these cases, the water-reducing properties of a combination of such materials is merely the aggregate of the water-reducing properties of the individual components.

Examples 6 to 8 are cases wherein the proportion of b3 is varied. It can be seen that, when the quantity of b3 present is not more than 30 weight percent of the total quantity of hydrogenated saccharide, there is no coagulation, and the same synergistic water-reducing properties reported hereinabove are again observed. In contrast, Comparison Example 9 and Comparison Example 12 are cases where the proportions of b3 exceeding 30 weight percent of the total quantity of hydrogenated saccharides and in these cases mortar will coagulate. In the case of Comparison Example 5 where b3 alone is used, coagulation is considerable.

Examples 9 and 10 are cases wherein the mixture proportions of water-reducing agent and hydrogenated saccharides are varied. When the ranges of 75 to 25 weight percent water-reducing agent and 25 to 75 weight percent hydrogenated saccharides are used, the water-reducing properties of the combination exceeds the aggregate of the individual water-reducing properties of the water-reducing agent and the hydrogenated saccharides; the effect is synergistic, with considerable improvements in water-reducing properties. In contrast, Comparison Examples 13 and 14 are cases where the ranges of water-reducing agent and hydrogenated saccharides lie outside those given hereinabove. In these cases, the water-reducing properties of combination of the water-reducing agent and the hydrogenated saccharides are the aggregate of the individual water-reducing properties.

Examples 11 to 13 are cases of lignosulfonate (Lig), melamine sulfonate-formalin condensate (MS), and naphthalene sulfonate-formalin condensate (BNS) combined as other ingredients with polycarboxylate (PCA) as the water-reducing agent. When these other water-reducing agents are combined with polycarboxylate, provided that the ratio of the polycarboxylate water-reducing agent and the hydrogenated polysaccharide is kept within the limits of this invention, the synergistic effect previously reported is still given.

In Comparison Example 6, b1 and b2 are combined at a ratio of 1:1, and in this case, the aggregate water-reducing properties of this combination is the aggregate of the individual water-reducing properties of b1 and b2. Comparison Examples 7 and 8 are respectively examples of a water-reducing agent combined with b1 or b2 alone, and in such cases only the aggregate of the water-reducing properties of the individual components is given.

b) Air entraining Properties

On comparing air contents in Examples 1 to 13, they are approximately of the same degree as in Comparison Example 2, and air is not excessively entrained.

Table 4 similarly shows the advantages of using polyhydric alcohol adducts of saccharides.

3-2) Concrete

The results of tests with concrete are given in Table 5. The concretes listed in Table 5 are all prepared such that they have slumps in the range 18.0±0.5 cm and air contents of 4.5±0.5%. In Table 5, the results of tests performed on Examples 33–38 (hydrogenated saccharide-containing) and 39–45 (polyhydric alcohol adduct of saccharide containing) and on concretes utilizing water-reducing agents not combined with hydrogenated saccharides (Comparison Examples 21 to 24) comparing setting times, compressive strengths, bleeding, and workability are indicated. As seen in the results given in Table 5, on examination of the cases wherein the admixture of this invention is used in concrete (Examples 33–45), the following effects are observed:

a) Water-reducing Properties

As is clear from comparing Examples 33 and 34 with Comparison Example 21, and Examples 35–38 with Comparison Examples 22–24, approximately the same slumps are obtained in the examples even when the dosages of admixtures are smaller than in the Comparison Examples, and it can be seen that water-reducing properties have been improved.

b) Air-entraining properties

Air contents are found to be in the range of 4.5±0.5% (without using a defoaming agent) and the air-entraining properties are low.

c) Bleeding

As is clear on comparing with the Comparison Examples, bleeding is considerably reduced and segregation is inhibited.

d) Workability (Visual Observation)

Comparison with the Comparison Examples shows that all examples exhibit good workability.

e) Setting Time

As is clear on comparing with Comparison Examples, setting time is about 20 to 30 minutes faster than when using a water-reducing agent alone, and there is little or no set retardation.

f) Compressive Strength (28-Day)

As is clear on comparing with the Comparison Examples, there are attained compressive strengths of about the same degree as those given when using water-reducing agent alone.

TABLE 1

| Water-Cement Ratio | Sand-Cement Ratio | Unit Content (g) | | |
|---|---|---|---|---|
| | | Water | Cement | Fine Aggregate |
| 0.45 | 2.75 | 450 | 1,000 | 2,750 |

TABLE 2

| Water-Cement Ratio | Sand Aggregate Ratio % | Unit Content (g) | | | |
|---|---|---|---|---|---|
| | | | | Aggregate | |
| | | Water | Cement | Fine | Coarse |
| 0.60 | 46.0 | 185 | 285 | 807 | 973 |

TABLE 3

| | water reducing agent | | Hydrogenated Saccharide | | | | Flow | Air | Flow Increase | Synergistic Effect in Water |
|---|---|---|---|---|---|---|---|---|---|---|
| | Kind | Dosage[1] | Composition, wt % | | | Dosage[1] | (mm) | (%) | (mm) | Reduction |
| Example | | | | | | | | | | |
| 1 | PCA | 0.30 | 70 | 30 | 0 | 0.20 | 247 | 6.2 | 67 | yes |
| 2 | PCA | 0.30 | 60 | 40 | 0 | 0.20 | 247 | 6.1 | 67 | yes |
| 3 | PCA | 0.30 | 50 | 50 | 0 | 0.20 | 246 | 6.2 | 66 | yes |
| 4 | PCA | 0.30 | 40 | 60 | 0 | 0.20 | 245 | 6.2 | 65 | yes |
| 5 | PCA | 0.30 | 30 | 70 | 0 | 0.20 | 243 | 6.0 | 63 | yes |
| 6 | PCA | 0.30 | 50 | 40 | 10 | 0.20 | 246 | 6.1 | 66 | yes |
| 7 | PCA | 0.30 | 50 | 35 | 15 | 0.20 | 240 | 6.0 | 60 | yes |
| 8 | PCA | 0.30 | 40 | 40 | 20 | 0.20 | 238 | 5.9 | 58 | yes |
| 9 | PCA | 0.30 | 60 | 40 | 0 | 0.15 | 235 | 5.7 | 55 | yes |
| 10 | PCA | 0.30 | 50 | 50 | 0 | 0.15 | 235 | 5.6 | 55 | yes |
| 11 | PCA Lig | 0.25 0.05 | 60 | 40 | 0 | 0.20 | 247 | 6.3 | 67 | yes |
| 12 | PCA MS | 0.25 0.05 | 60 | 40 | 0 | 0.20 | 248 | 6.0 | 68 | yes |
| 13 | PCA BNS | 0.25 0.05 | 60 | 40 | 0 | 0.20 | 248 | 6.1 | 68 | yes |
| 14 | SMA | 0.30 | 60 | 40 | 0 | 0.20 | 248 | 6.1 | 68 | yes |
| Comparison Example | | | | | | | | | | |
| 1 | — | — | — | — | — | — | 180 | 3.1 | — | — |
| 2 | PCA | 0.30 | — | — | — | — | 209 | 5.1 | 29 | No |
| 3 | — | — | 100 | — | — | 0.20 | 194 | 5.3 | 14 | No |
| 4 | — | — | — | 100 | — | 0.20 | 185 | 5.3 | 5 | No |
| 5 | — | — | — | — | 100 | 0.20 | 108 | 5.4 | −72 | No |
| 6 | — | — | 50 | 50 | — | 0.20 | 189 | 5.4 | 9 | No |
| 7 | PCA | 0.30 | 100 | — | — | 0.20 | 221 | 6.1 | 41 | No |
| 8 | PCA | 0.30 | — | 100 | — | 0.20 | 211 | 6.1 | 31 | No |
| 9 | PCA | 0.30 | — | — | 100 | 0.20 | 145 | 6.0 | −35 | No |
| 10 | PCA | 0.30 | 75 | 25 | 0 | 0.20 | 220 | 6.2 | 40 | No |
| 11 | PCA | 0.30 | 25 | 75 | 0 | 0.20 | 216 | 6.1 | 36 | No |
| 12 | PCA | 0.30 | 41 | 28 | 31 | 0.20 | 198 | 6.0 | 18 | No |
| 13 | PCA | 0.30 | 60 | 40 | 0 | 0.10 | 214 | 5.9 | 34 | No |
| 14 | PCA | 0.10 | 60 | 40 | 0 | 0.30 | 205 | 6.4 | 25 | No |

Note
[1]Dosage of cement additive by weight percent to weight of cement (in terms of solids).

TABLE 4

| | Water-reducing agent | | Polyhydric Alcohol Adduct of Saccharide | | Flow | Air | Flow increase | Synergistic Effect in |
|---|---|---|---|---|---|---|---|---|
| | Kind | Dosage[1] | Kind | Dosage[1] | (mm) | (%) | (mm) | Water Reduction |
| Example | | | | | | | | |
| 15 | PCA | 0.30 | Sample A | 0.20 | 250 | 6.1 | 70 | Yes |
| 16 | PCA | 0.30 | Sample B | 0.20 | 250 | 5.9 | 70 | Yes |
| 17 | PCA | 0.30 | Sample C | 0.20 | 251 | 6.2 | 71 | Yes |
| 18 | PCA | 0.30 | Sample D | 0.20 | 250 | 6.0 | 70 | Yes |
| 19 | PCA | 0.30 | Sample E | 0.20 | 251 | 6.1 | 71 | Yes |
| 20 | PCA | 0.30 | Sample F | 0.20 | 248 | 6.2 | 69 | Yes |
| 21 | PCA | 0.30 | Sample G | 0.20 | 250 | 6.0 | 70 | Yes |
| 22 | PCA | 0.30 | Sample H | 0.20 | 252 | 6.1 | 72 | Yes |
| 23 | PCA | 0.30 | Sample I | 0.20 | 248 | 6.5 | 68 | Yes |
| 24 | PCA | 0.30 | Sample J | 0.20 | 250 | 7.0 | 70 | Yes |
| 25 | PCA | 0.30 | Sample K | 0.20 | 251 | 6.0 | 71 | Yes |
| 26 | PCA | 0.30 | Sample L | 0.20 | 253 | 6.1 | 73 | Yes |
| 27 | PCA | 0.30 | Sample M | 0.20 | 254 | 5.9 | 74 | Yes |
| 28 | PCA | 0.30 | Sample N | 0.20 | 253 | 6.0 | 73 | Yes |
| 29 | PCA | 0.30 | Sample O | 0.20 | 253 | 6.0 | 73 | Yes |
| 30 | SMA | 0.30 | Sample P | 0.20 | 253 | 6.0 | 73 | Yes |
| 31 | PCA BNS | 0.25 0.05 | Sample Q | 0.20 | 253 | 6.0 | 73 | Yes |
| 32 | PCA MS | 0.25 0.05 | Sample G | 0.20 | 253 | 6.0 | 73 | Yes |

TABLE 4-continued

| | Water-reducing agent | | Polyhydric Alcohol Adduct of Saccharide | | Flow | Air | Flow in- | Synergistic Effect in |
|---|---|---|---|---|---|---|---|---|
| | Kind | Dosage[1] | Kind | Dosage[1] | (mm) | (%) | crease (mm) | Water Reduction |
| Comparison Example | | | | | | | | |
| 15 | — | — | Sample A | 0.20 | 193 | 5.4 | 13 | No |
| 16 | — | — | Sample D | 0.28 | 183 | 5.8 | 13 | No |
| 17 | — | — | Sample C | 0.20 | 193 | 5.4 | 15 | No |
| 18 | — | — | Sample G | 0.20 | 199 | 5.5 | 19 | No |
| 19 | PCA | 0.30 | Sample P | 0.20 | 160 | 6.0 | −20 | No |
| 20 | PCA | 0.30 | Sample Q | 0.30 | 243 | 13.5 | 63 | Yes |

Note
[1] Dosage of cement additive by weight percent to weight of cement (in terms of solids).

TABLE 5

| | water-reducing agent | | Hydrogenated Saccharide Composition, wt % | | | | | Polyhydric Alcohol Adduct of Saccharide | | Setting Time (hr-min) | | Compressive Strength (28-Day) (kgf/cm$^2$) | Bleeding (cm$^3$/cm$^2$) | Workability Evaluation |
|---|---|---|---|---|---|---|---|---|---|---|---|---|---|---|
| | Kind | Dosage[1] | b1 | b2 | b3 | Dosage[1] | | Kind | Dosage[1] | Initial | Final | | | |
| Example | | | | | | | | | | | | | | |
| 33 | PCA | 0.15 | 60 | 40 | 0 | 0.10 | | — | — | 6-10 | 8-10 | 327 | 0.25 | A |
| 34 | PCA | 0.15 | 50 | 30 | 10 | 0.10 | | — | — | 6-15 | 8-20 | 330 | 0.26 | A |
| 35 | PCA Lig | 0.10 0.05 | 60 | 40 | 0 | 0.10 | | — | — | 6-40 | 8-45 | 325 | 0.28 | A |
| 36 | PCA MS | 0.10 0.05 | 60 | 40 | 0 | 0.10 | | — | — | 6-00 | 8-00 | 328 | 0.26 | A |
| 37 | PCA BNS | 0.10 0.05 | 60 | 40 | 0 | 0.10 | | — | — | 6-20 | 8-20 | 326 | 0.27 | A |
| 38 | SMA | 0.15 | 60 | 40 | 0 | 0.10 | | — | — | 6-15 | 8-25 | 322 | 0.25 | A |
| 39 | PCA | 0.15 | — | — | — | — | | Sample B | 0.10 | 6-10 | 8-10 | 327 | 0.25 | A |
| 40 | PCA | 0.15 | — | — | — | — | | Sample B | 0.10 | 6-15 | 8-20 | 330 | 0.26 | A |
| 41 | PCA Lig | 0.10 0.05 | — | — | — | — | | Sample B | 0.10 | 6-35 | 8-40 | 326 | 0.26 | A |
| 42 | PCA MS | 0.10 0.05 | — | — | — | — | | Sample B | 0.10 | 6-05 | 8-05 | 329 | 0.24 | A |
| 43 | PCA BNS | 0.10 0.05 | — | — | — | — | | Sample B | 0.10 | 6-15 | 8-15 | 327 | 0.25 | A |
| 44 | SMA | 0.15 | — | — | — | — | | Sample B | 0.10 | 6-15 | 8-25 | 322 | 0.25 | A |
| 45 | PCA | 0.15 | 60 | 30 | 10 | 0.05 | | Sample B | 0.05 | 6-15 | 8-25 | 322 | 0.25 | A |
| Comparison Example | | | | | | | | | | | | | | |
| 21 | PCA | 0.30 | — | — | — | — | | — | — | 6-45 | 8-55 | 322 | 0.35 | B |
| 22 | PCA Lig | 0.20 0.10 | — | — | — | — | | — | — | 6-50 | 8-50 | 324 | 0.37 | C |
| 23 | PCA MS | 0.20 0.10 | — | — | — | — | | — | — | 6-30 | 8-30 | 322 | 0.35 | C |
| 24 | PCA BNS | 0.20 0.10 | — | — | — | — | | — | — | 6-40 | 8.35 | 322 | 0.34 | B |

Note
[1] Dosage of cement additive by weight percent to weight of cement (in terms of solids)

We claim:

1. An admixture for use in a cementitious composition, which admixture consists of
   (a) from 75–25% by weight of a water-reducing agent whose major component is a polycarboxylate; and
   (b) from 25–75% by weight of at least one saccharide component selected from the group consisting of hydrogenated saccharides and polyhydric alcohol adducts of saccharides.

2. An admixture according to claim 1, wherein the water reducing agent comprises at least 60% by weight of polycarboxylate.

3. An admixture according to claim 1, wherein the polycarboxylate is selected from the group consisting of poly (acrylate salt-acrylate ester) copolymers, poly(methacrylic acid-methacrylate) copolymers, poly(styrene-maleate salt) copolymers, and poly(styrene-maleate ester) copolymers.

4. An admixture according to claim 1, wherein the saccharide component comprises hydrogenated saccharide in which
   (i) 70–30% by weight (on total weight of hydrogenated saccharides) have weight average molecular weights in the range 180–300;
   (ii) 30–70% by weight have weight average molecular weight of from 300 up to 4,000; and (iii) 30% by weight maximum have weight average molecular weights of 4,000 and over.

5. An admixture according to claim 1, wherein the hydrogenated saccharide is a polysaccharide.

6. An admixture according to claim 1, wherein the polysaccharide is a hydrogenated hemicellulose or a hydrogenated starch hydrolysate.

7. An admixture according to claim 1, wherein the polyhydric alcohol from which the polyhydric alcohol adduct of a polysaccharide is derived is selected from the group consisting of alkylene glycols, polyalkylene glycols, glycerol, xylitol, erythritol and sorbitol.

8. An admixture according to claim 7, wherein the polyhydric alcohol is selected from the group consisting of polyethylene glycol and polypropylene glycol such that the number of moles of ethylene oxide or propylene oxide present per mole of saccharide is from 1–100.

9. A cementitious composition which comprises cement and an admixture, which admixture consists of
(a) from 75–25% by weight of a water-reducing agent whose major component is a polycarboxylate; and
(b) from 25–75% by weight of at least one saccharide component selected from the group consisting of hydrogenated saccharides and polyhydric alcohol adducts of saccharides.

10. A cementitious composition which comprises cement and an admixture which consists of:
(a) from 75–25% by weight of a water-reducing agent whose major component is a polycarboxylate; and,
(b) from 25–75% by weight of at least one hydrogenated saccharide component in which, based on the total weight of the hydrogenated saccharides:
70–30% by weight have a weight average molecular weight in the range of from 180 to 300;
30–70% by weight have a weight average molecular weight in the range of from 300 to 4000; and,
not greater than 30% by weight have a weight average molecular weight of at least 4000.

11. A cementitious composition according to claim 9 wherein:
the water-reducing agent further comprises a non-carboxylate water reducing agent.

12. A cementitious composition according to claim 11 wherein:
the water-reducing agent further comprises a non-carboxylate water reducing agent selected from lignosulphonates and naphthalene sulphonate-formaldehyde condensates.

13. A method for reducing the water demand of a cementitious composition which comprises the step of:
adding to a cementitious composition an admixture which consists of:
(a) from 75–25% by weight of a water reducing agent, whose major component is a polycarboxylate; and
(b) from 25–75% by weight of at least one saccharide component selected from the group consisting of hydrogenated saccharides and polyhydric alcohol adducts of saccharides.

14. The method according to claim 13, wherein the water reducing agent of the admixture comprises at least 60% by weight of polycarboxylate.

15. The method according to claim 13, wherein the admixture includes a polycarboxylate selected from the group consisting of poly(acrylate salt-acrylate ester) copolymers, poly(methacrylic acid-methacrylate) copolymers, poly(styrene-maleate salt) copolymers, and poly(styrene-maleate ester)copolymers.

16. The method according to claim 13, wherein the hydrogenated saccharide component of the admixture consists of:
(a) 70–30% by weight (on total weight of hydrogenated saccharides) have weight average molecular weights in the range 180–300;
(b) 30–70% by weight have weight average molecular weight of from 300 up to 4000;
(c) 30% by weight maximum have weight average molecular weights of 4000 and over.

17. The method according to claim 13, wherein the hydrogenated saccharide in the admixture is a polysaccharide.

18. The method according to claim 13, wherein the hydrogenated polysaccharide in the admixture is a hydrogenated hemicellulose or a hydrogenated starch hydrolysate.

* * * * *